(12) United States Patent
Williams et al.

(10) Patent No.: US 6,564,880 B2
(45) Date of Patent: May 20, 2003

(54) MANUALLY-OPERATED, WATER-POWERED DIGGING TOOL

(75) Inventors: Clyde R. Williams, Alpharetta, GA (US); David M. Guinee, Decatur, GA (US)

(73) Assignee: Williams Die & Mold, Inc., Suwanee, GA (US)

( * ) Notice: Subject to any disclaimer, the term of this patent is extended or adjusted under 35 U.S.C. 154(b) by 0 days.

(21) Appl. No.: 09/844,781

(22) Filed: Apr. 27, 2001

(65) Prior Publication Data

US 2002/0062584 A1 May 30, 2002

Related U.S. Application Data

(60) Provisional application No. 60/200,860, filed on May 1, 2000.

(51) Int. Cl.[7] .................................................. A01B 1/00
(52) U.S. Cl. ..................... 172/371; 37/905; 239/463; 239/383
(58) Field of Search .................. 172/371, 41; 239/526, 239/530, 279, 276, 463, 383; 37/905

(56) References Cited

U.S. PATENT DOCUMENTS

| | | | | |
|---|---|---|---|---|
| 3,638,741 A | * | 2/1972 | Zizak | |
| 3,865,194 A | * | 2/1975 | Chatfield, Jr. | |
| 3,993,250 A | * | 11/1976 | Shure | |
| 4,271,909 A | * | 6/1981 | Chatfield, Jr. et al. | |
| 4,314,671 A | * | 2/1982 | Briar | |
| 4,352,251 A | * | 10/1982 | Sloan | |
| 4,461,052 A | * | 7/1984 | Mostul | |
| 4,526,321 A | * | 7/1985 | Knudsen | |
| 4,757,946 A | * | 7/1988 | Johnson | |
| 4,776,517 A | * | 10/1988 | Heren | |
| 4,986,475 A | * | 1/1991 | Spadafora et al. | |
| 5,170,943 A | * | 12/1992 | Artzberger | |
| 5,190,217 A | * | 3/1993 | Black et al. | |
| 5,295,317 A | * | 3/1994 | Perrott | |
| 5,305,585 A | * | 4/1994 | Cousineau | |
| 5,408,766 A | * | 4/1995 | Pobihushchy | |
| 5,887,667 A | * | 3/1999 | Van Zante et al. | |
| 5,887,801 A | * | 3/1999 | Stevens | |
| 6,081,945 A | * | 7/2000 | Keene et al. | |
| 6,196,337 B1 | * | 3/2001 | Sikes | |
| 6,202,330 B1 | * | 3/2001 | Bolton | |
| 6,216,961 B1 | * | 4/2001 | Utter et al. | |

\* cited by examiner

*Primary Examiner*—Victor Batson
(74) *Attorney, Agent, or Firm*—Baker, Donelson, Bearman & Caldwell

(57) ABSTRACT

A manually-operated, water-powered digging tool which does not utilize a pressure gauge, and a process for digging holes with such tool.

8 Claims, 3 Drawing Sheets

MANUALLY-OPERATED, WATER-POWERED DIGGING TOOL

This application claims the benefit of U.S. Provisional Application Serial No. 60/200,860, filed May 1, 2000.

TECHNICAL FIELD

The present invention relates to a manually-operated digging tool. In a more specific aspect, this invention relates to a manually-operated, water powered digging tool in which the flow of water can be selectively controlled. This invention also relates to a process for the use of such manually-operated, water-powered digging tool.

BACKGROUND OF THE INVENTION

There are many situations in which an opening (i.e., a hole) must be created to accomplish a particular task. These situations occur frequently in a home or other residential environment. The particular tasks which may require a hole are varied and numerous, examples of which include gardening, landscaping and the installation of mail boxes, bird houses/feeders, trellises, arches and posts of various types.

The traditional methods of creating holes generally involve shovels, posthole diggers, augers, power-driven augers or other similar tools. Depending on the size of the desired hole, much time and physical effort may be required. Even with these disadvantages, traditional methods are still in use.

Efforts have been made to develop tools or other devices which would make hole-digging easier and faster. The gas-powered auger is an example of these efforts.

Another example of these efforts is a water-powered hole-digging device (used with a standard garden hose) which was marketed by mail order in about 1963. This device employed a pressure gauge and was generally inefficient and of little help in the digging of holes.

Another example of these efforts is a gauge-less, water-powered hole-digging device (also used with a standard garden hose) which was marketed in 1998–1999. This device did not employ a pressure gauge and, therefore, represented an improvement over the prior art. However, this device did not solve the problems and disadvantages of prior digging tools.

Consequently, a need remains for a digging tool which is efficient in the digging of holes in different terrain and which is capable of digging holes more quickly and with less physical effort.

SUMMARY OF THE INVENTION

Briefly described, the present invention provides a manually-operated, water-powered digging tool which does not utilize a pressure gauge. The water-powered digging tool of this invention functions with a standard garden hose.

In addition, the present invention provides a process for the use of the manually-operated, water-powered digging tool of this invention.

Accordingly, an object of this invention is to provide a manually-operated, water-powered digging tool.

Another object of this invention is to provide a water-powered digging tool which does not utilize a pressure gauge.

Another object of this invention is to provide a water-powered digging tool in which the flow of water can be controlled by a manually-operated trigger device.

Another object of this invention is to provide a water-powered digging tool which is useful and efficient in creating holes in different types of terrain.

Still another object of this invention is to provide a processor digging holes with a water-powered digging tool.

Still another object of this invention is to provide a process for digging holes with a water-powered digging tool which does not utilize a pressure gauge.

Still another object of this invention is to provide a process for digging holes in an efficient manner which requires only a reasonable amount of time and physical effort.

Still another object of this invention is to provide a process for digging holes with a water-powered digging tool in which the flow of water can be controlled by a manually-operated trigger device.

Still another object of this invention is to provide a process for digging holes in different types of terrain.

These and other objects, features and advantages of this invention will become apparent from the following detailed description.

DETAILED DESCRIPTION OF THE INVENTION

The present invention provides a gauge-less, water-powered digging tool consisting essentially of:

A. a handle having an inlet at one end for receiving water and being closed at the other end;

B. an elongated tubular section having top, middle and bottom portions through which water flows, the top portion being connected to the handle, the middle portion being of uniform diameter, the bottom portion having an area which is narrower from side to side than the top and middle portions and the bottom portion terminating in an area which is narrower from front to back than the top and middle portions and through which the water exits;

C. an impeller located within the elongated tubular section; and

D. a manually-operated trigger device for controlling the flow of water into the inlet and through the elongated tubular section.

In addition, the present invention provides a process for digging holes, wherein the process comprises introducing water into a gauge-less, water-powered digging tool which consists essentially of:

A. a handle having an inlet at one end for receiving water and being closed at the other end;

B. an elongated tubular section having top, middle and bottom portions through which water flows, the top portion being connected to the handle, the middle portion being of uniform diameter, the bottom portion having an area which is narrower from side to side than the top and middle portions and the bottom portion terminating in an area which is narrower from front to back than the top and middle portions and through which the water exits;

C. an impeller located within the elongated tubular section; and

D. a manually-operated trigger device for controlling the flow of water into the inlet and through the elongated tubular section, wherein the digging is accomplished by the water exiting from the bottom portion of the elongated tubular section.

Figure 1:
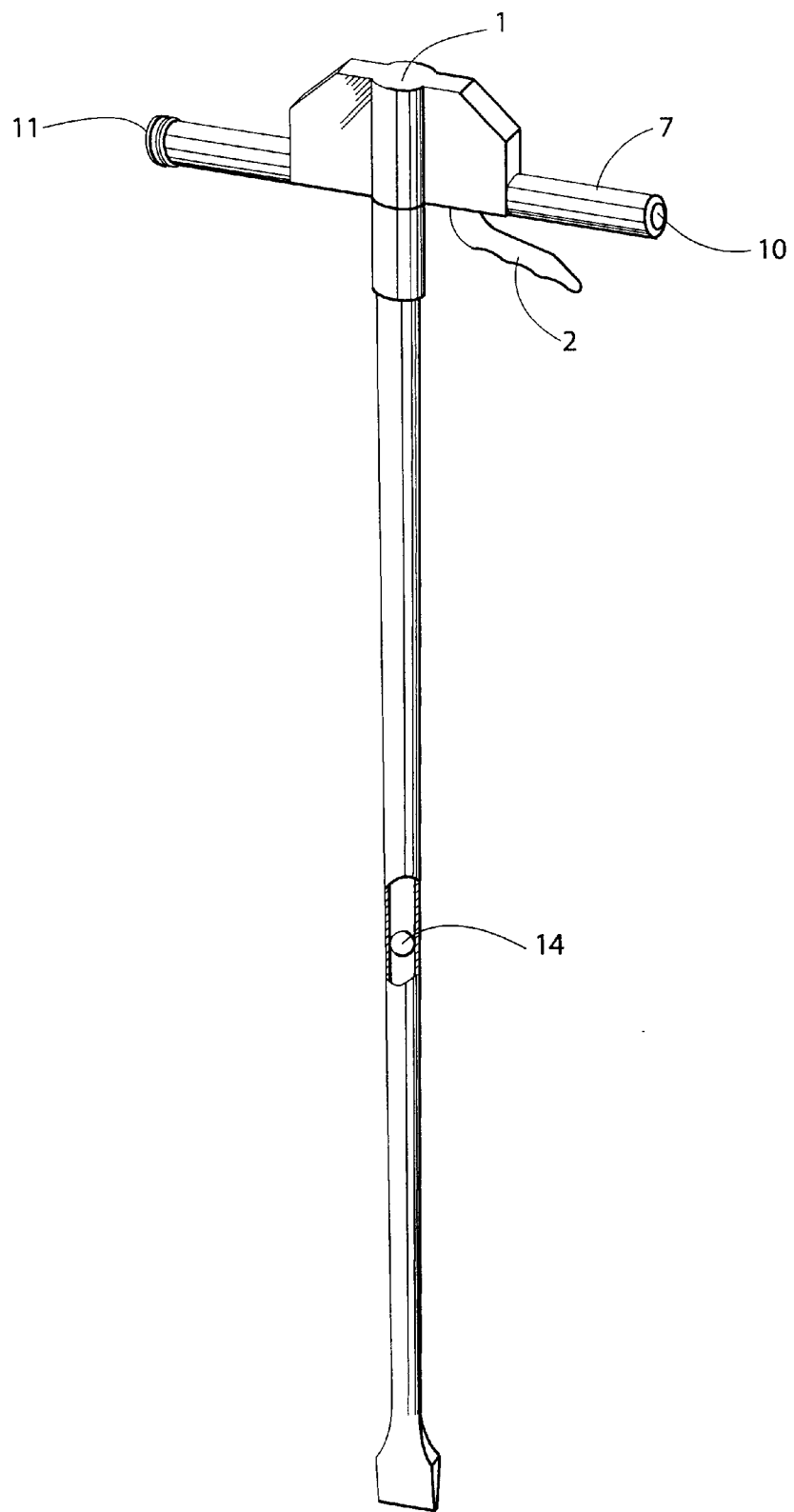
FIG. 1 is a front view of a preferred embodiment of the water-powered digging tool of this invention.

The dual narrowing portions of the elongated tubular section are described in reference to the front view as shown in FIG. 1. Additionally, the elongated tubular section may also be characterized as rod-shaped.

FIG. 1 shows a front view of a preferred embodiment of the tool of this invention.

Figure 2:
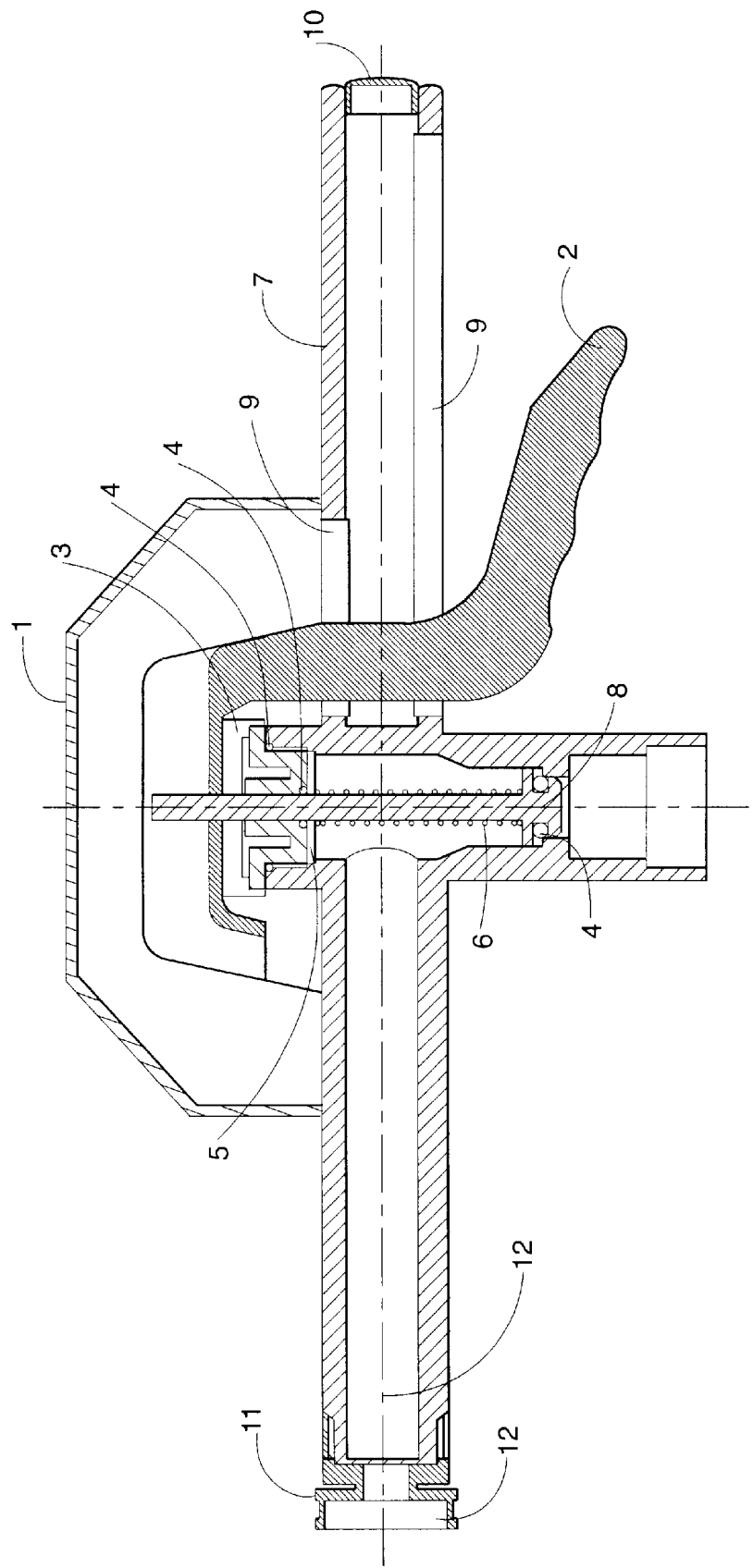
FIG. 2 is a cut-away view of the upper portion of the water-powered digging tool of this invention.

With reference to FIG. 2 which is a cut-away view of the upper portion of the tool of this invention, the trigger device 2 is shown within the cover 1 and housing 7. Associated and movable with the trigger device 2 are o-rings 4, spring 6 and plunger 8. Water enters the tool through inlet 12 which is formed by connecting a hose to the handle at hose connector 11. The operation of this tool is described in more detail with reference to FIG. 3.

Figure 3:
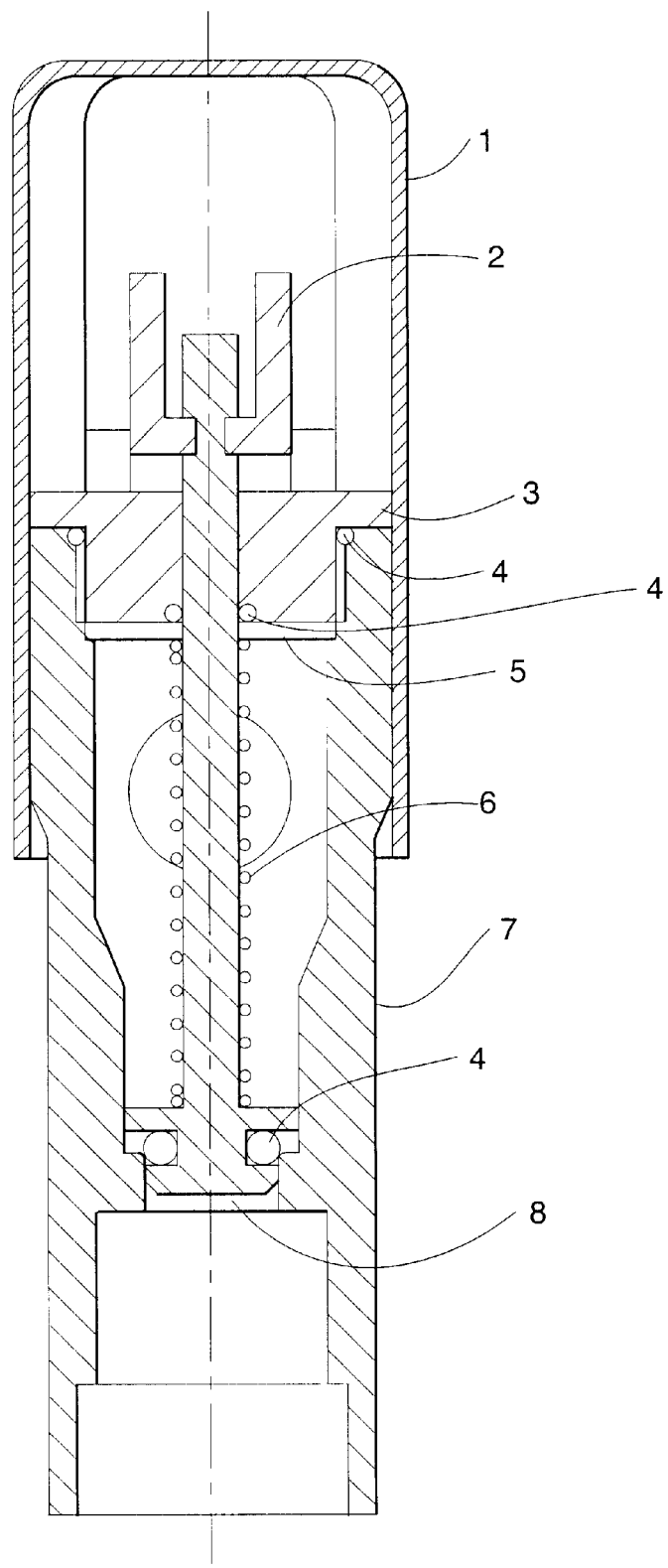
FIG. 3 is a cut-away view of the cover and housing portions of the water-powered digging tool of this invention.

With reference to FIG. 3 which is a cut-away view of the cover and housing portions of the tool of this invention, the trigger device 2 is shown in an unsqueezed or inactivated position within the cover 1 and housing 7. The flow of water into the elongated tubular portion of the tool is prevented when the spring 6 is in a relaxed position (i.e., no force on the trigger device is exerted by the user) and the o-rings 4 are seated. The cap 3 prevents leakage of water outside the handle of the tool. The cap 3 protects the trigger device 2.

When the user squeezes the trigger 2 during use of this tool, the spring 6 is compressed, thereby moving the plunger 8 and unseating the o-rings 4. Consequently, water enters the handle through inlet 12, flows past the o-rings 4 and into the elongated tubular section and then exits through the bottom of this section with a force and pressure sufficient to dig the appropriate hole. The flow of water is halted when the trigger 2 is released by the user.

Although the overall dimensions of the various parts of this tool can be varied, preferably these dimensions are as follows:

| | |
|---|---|
| Length | 38–43 inches |
| Length of elongated tubular section | 34–39 inches |
| Diameter of elongated tubular section | 0.25–2.0 inches |
| Length of handle as assembled | 12–16 inches |
| Width of handle | 1–3 inches |
| Diameter of inlet | .25–1.0 inches |
| Narrower side to side area of elongated tubular section | Located 4–8 inches from bottom to center line of narrower portion |
| Diameter of impeller | Less than inside diameter of elongated tubular section |

The water-powered, digging tool of this invention must be constructed of durable material, such as plastic or metal. The trigger device is unique for a water-powered digging tool and functions to control the flow of water into the inlet. In use, the water flow/pressure will increase as the trigger is squeezed (i.e., activated) with more force by the user. On the other hand, less force by the user results in a decrease of the water flow/pressure. Of course, water does not flow through the handle into the elongated tubular section until the trigger is squeezed by the user.

The impeller (shown as 14 in FIG. 1) can have various shapes, but preferably is spherical. The impeller is preferably made from a plastic material, but other durable materials can be used, such as metal.

The inlet and trigger device work together to provide and distribute the incoming water to the elongated tubular section. The inlet preferably is a conventional part designed for use with a standard garden hose.

Without a pressure gauge, an unexpected advantage results in regard to time and physical effort when using the tool of this invention. Holes of various depths and sizes can be dug in different types of terrain with the water-powered digging tool of this invention.

In use, a standard garden hose is connected to the inlet, and the water is provided through the trigger device and through the top, middle and bottom portions of the elongated tubular section.

Due to the impeller and the dual narrowing (i.e., constrictions) of the bottom portion, the water exits the bottom portion at a flow rate and drill pattern sufficient to accomplish the digging process.

This invention has been described in detail with particular reference to certain embodiments, but variations and modifications can be made without departing from the spirit and scope of the invention as defined in the following claims.

What is claimed is:

1. A gauge-less, water-powered digging tool consisting essentially of:

A. a handle having an inlet at one end for receiving water and being closed at the other end;

B. an elongated tubular section having top, middle and bottom portions through which water flows, the top portion being connected to the handle, the middle portion being of uniform diameter, the bottom portion having an area which is narrower from side to side than the top and middle portions and the bottom portion terminating in an area which is narrower from front to back than the top and middle portions and through which the water exits;

C. an impeller located within the elongated tubular section, wherein the impeller is a spherical ball of durable material and has a diameter which is less than the inside diameter of the elongated tubular section; and D. a manually-operated trigger device for controlling the flow of water into the inlet and through the elongated tubular section.

2. A digging tool as defined by claim 1 wherein the length of the elongated tubular section is less than the overall length of the digging tool.

3. A digging tool as defined by claim 1 wherein the diameter of the elongated tubular section is from about 0.25 to about 2.0 inches.

4. A digging tool as defined by claim 1 wherein the impeller is a spherical ball of plastic.

5. A process for digging holes, wherein the process comprises introducing water into a gauge-less, water-powered digging tool which consists essentially of:

A. a handle having an inlet at one end for receiving water and being closed at the other end;

B. an elongated tubular section having top, middle and bottom portions through which water flows, the top portion being connected to the handle, the middle portion being of uniform diameter, the bottom portion having an area which is narrower from side to side than the top and middle portions and the bottom portion terminating in an area which is narrower from front to back than the top and middle portions and through which the water exits;

C. an impeller located within the elongated tubular section, wherein the impeller is a spherical ball of durable material and has a diameter which is less than the inside diameter of the elongated tubular section; and D. a manually-operated trigger device for controlling the flow of water into the inlet and through the elongated tubular section, wherein the digging is accomplished by the water exiting from the bottom portion of the elongated tubular section.

6. A process as defined by claim 5 wherein the length of the elongated tubular section is less than the overall length of the digging tool.

7. A process as defined by claim 5 wherein the diameter of the elongated tubular section is from about 0.25 to about 2.0 inches.

8. A process as defined by claim 5 wherein the impeller is a spherical ball of plastic.

* * * * *